US010445061B1

(12) United States Patent
Cao et al.

(10) Patent No.: US 10,445,061 B1
(45) Date of Patent: Oct. 15, 2019

(54) MATCHING ENTITIES DURING DATA MIGRATION

(71) Applicant: LinkedIn Corporation, Sunnyvale, CA (US)

(72) Inventors: Kancheng Cao, Palo Alto, CA (US); Dakan Wang, Sunnyvale, CA (US); Bill Bi Lun Kuang, Alameda, CA (US); Gururaj Seetharama, Sunnyvale, CA (US); Manoj Rameshchandra Thakur, Sunnyvale, CA (US); Jan Schellenberger, Belmont, CA (US); Nan Zhou, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 289 days.

(21) Appl. No.: 15/361,938

(22) Filed: Nov. 28, 2016

Related U.S. Application Data

(60) Provisional application No. 62/418,648, filed on Nov. 7, 2016.

(51) Int. Cl.
*G06F 7/02* (2006.01)
*G06F 16/951* (2019.01)
*G06F 16/2455* (2019.01)

(52) U.S. Cl.
CPC ............ *G06F 7/02* (2013.01); *G06F 16/2455* (2019.01); *G06F 16/951* (2019.01)

(58) Field of Classification Search
CPC ................. G06F 7/02; G06F 17/30864; G06F 17/30477; G06F 16/2455; G06F 16/951
See application file for complete search history.

(56) References Cited

U.S. PATENT DOCUMENTS

| 2006/0230035 | A1* | 10/2006 | Bailey | G06F 17/3064 |
| 2011/0035371 | A1* | 2/2011 | Pong | G06F 17/30557 |
| | | | | 707/722 |
| 2018/0121550 | A1* | 5/2018 | Jeon | G06F 17/30867 |

FOREIGN PATENT DOCUMENTS

WO    WO-9709676 A1 *  3/1997  ........... G06F 3/0607

OTHER PUBLICATIONS

Wikipedia, The Free Encyclopedia; "Federated Search" downloaded from https://en.wikipedia.org/wiki/Federated_search on Apr. 11, 2017.

(Continued)

*Primary Examiner* — Albert M Phillips, III
(74) *Attorney, Agent, or Firm* — Park, Vaughan, Fleming & Dowler LLP

(57) ABSTRACT

A system, method, and apparatus are provided for migrating contacts (e.g., records identifying contacts) from one domain to another. Each record includes various fields corresponding to a single contact or other entity known within the first domain. The migration process may involve configuring multiple queries from the field data, for querying the second domain or system to identify (or to attempt to identify) matching entities known within the second domain. One or more exact queries may be configured to identify specific entities within the second domain, based on entity-specific data, for example. Other queries may be more general and may match multiple entities known within the second domain. For records for which no exact query identifies an entity, one or more general queries may be executed to identify multiple entities, which may be subsequently ranked based on the likelihood that they are the entity that corresponds to the record.

17 Claims, 4 Drawing Sheets

Member Match

Data Record 310                    Member Profile 312

Organization Match

Data Record 320                    Member Profile 322

(56) References Cited

OTHER PUBLICATIONS

Wikipedia, The Free Encyclopedia; "Depth-first search" downloaded from https://en.wikipedia.org/wiki/Topological_sorting#Depth-first_search on Apr. 11, 2017.

* cited by examiner

MATCHING ENTITIES DURING DATA MIGRATION

RELATED APPLICATION

This application claims priority to U.S. Provisional Application Ser. No. 62/418,648, entitled "Unified Entity Resolution for Data Migration," filed on 7 Nov. 2016, which is incorporated herein by reference.

BACKGROUND

This disclosure relates to the fields of computer systems and data processing. More particularly, a system, method, and apparatus are provided for matching entity names between two data systems.

When one data processing system is adopted for use in place of or along with another system, data often must be migrated from the old system to the new system. In environments in which not much data is involved, rekeying or retyping the data into the new system may be a suitable method of performing the data migration. However, when a significant amount of data is involved, on the order of thousands of records, tens of thousands of records, or more, manually reentering the data is usually not an acceptable method of migration.

Further, when the data records identify associates, friends, colleagues, and/or other contacts, there is a natural desire to ensure that the data, after migration, is accurately associated with the same contacts. Thus, if a given contact is identified with one set of unique information (e.g., username, electronic mail address) in an old data processing system, and is identified with a different set of unique information in a new data processing system to which his or her contact data is being migrated, it is highly desirable to match the contact's information with the correct contact in the new data processing system. Because different fields or details may be used by the different systems, it can be difficult to perform this matching in a timely and/or accurate manner.

Yet further, existing methods of data migration usually operate in batch or offline modes and may attempt to match contacts from the old system with a static (e.g., cached) set of contacts in the new system. Because the migration is not performed in real time, the migrated data may not be available when required and, in addition, may not be accurate because new contacts may have become available in the new system after creation of the static set of contacts.

DETAILED DESCRIPTION

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a method, system, and apparatus are provided for migrating data between different data processing domains or systems. The data that is to be migrated may comprise records that identify users of either or both data processing domains, or friends, associates, colleagues, and/or other contacts of a user or operator of either or both data processing domains.

In some implementations, the data records correspond to individual contacts of an employee, operator, or user of a first data processing domain, and/or organizations with which the user communicates. Some or all of the contacts may be known within a second data processing domain. The first and second domains may correspond to different applications, databases, online services or systems, network domains, or other logically distinct electronic domains or environments.

For example, the first data processing domain may be or may comprise a collection of data records maintained within one application, database, or service, while the second data processing domain may be or may comprise a social networking system or professional social networking system. In these implementations, migrating a data record obtained from the first data processing domain, which corresponds to a contact known within the first domain, involves attempting to match it with profiles of members/users of the social networking system to attempt to identify the member or user that matches (or best matches) the contact. The contacts represented by data records (in the first domain) and member profiles or other collections of member data (in the second domain) may include individuals and/or organizations.

Figure 1:
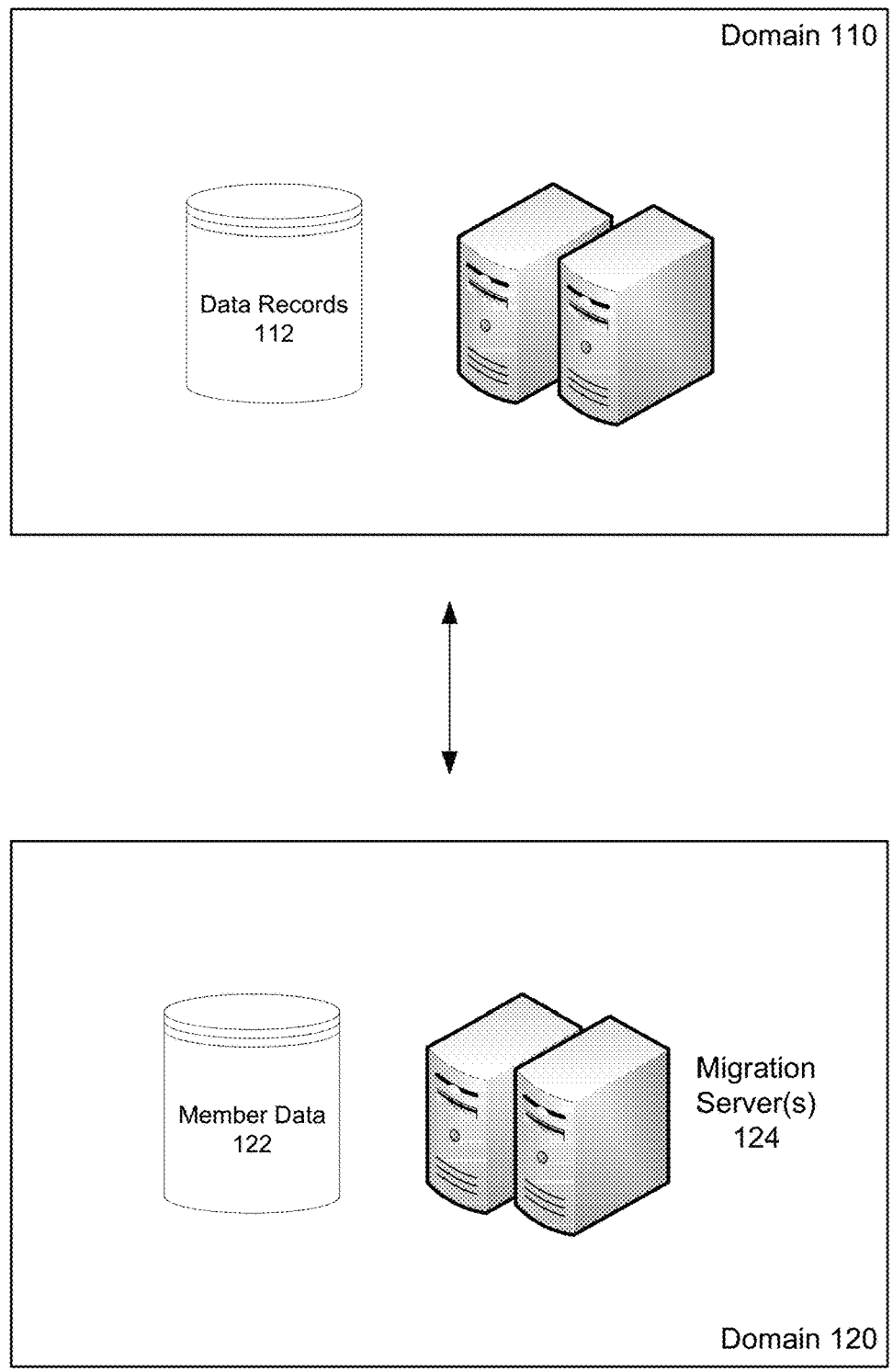
FIG. 1 is a block diagram depicting a computing environment in which data may be migrated between two data processing domains or systems, in accordance with some embodiments.

FIG. 1 is a block diagram depicting a computing environment in which data may be migrated between two different domains or systems, according to some embodiments.

The environment includes data processing domain (or system) 110, from which data are to be migrated, and data processing domain (or system) 120, to which the data are migrated. The environment may include additional domains or systems not depicted in FIG. 1. For example, data from one or more domains other than domain 110 may also be migrated to domain 120.

Domain 110 comprises data records 112 that identify any number of discrete entities, including individual persons and/or organizations. An organization may be a company, a corporation, a partnership, a firm, a government agency or entity, a not-for-profit entity, a group or collection of associated members, or some other entity formed for virtually any purpose (e.g., professional, social, fraternal, educational).

A given data record may include virtually any fields or terms, depending on the nature of the corresponding entity (e.g., individual, organization), such as name, telephone number, electronic mail address(es), industry, address(es), location, etc. Data records 112 may be stored in any suitable data repository, such as a relational database, distributed filesystem, key-value store, and/or other storage mechanism.

Domain 120, which is part of a professional social networking system in some implementations, includes migration server(s) 124 and maintains member data 122 that identify members or users of the professional social network system, including individual persons and/or organizations. An individual member's profile may include or reflect any number of attributes or characteristics of the member, including personal (e.g., gender, age or age range, interests, hobbies, member ID), professional (e.g., employment status, job title, job location, employer or associated organization, industry, functional area or role, skills, endorsements, professional awards, seniority), social (e.g., organizations the user is a member of, geographic area of residence, friends), educational (e.g., degree(s), university attended, other training), etc. A member's profile, or attributes or dimensions of the profile, may be used in various ways by system components (e.g., to identify or characterize the member, to characterize a member connection that involves the member, to characterize content with which the member interacts, to identify content topics/items that may interest the member, to select content to serve to the member, to record a content event).

Organizations may have profiles comprising attributes such as industry, size, location, goal or purpose, etc. Either or both organizations and individual members may "follow" and/or be followed by other members, may share and/or received shared information, may initiate and receive communications with other members, may post content and/or receive content posted by other members, may form connections with other members, etc.

Member data 122 may be stored in any suitable data repository, such as a relational database, distributed filesystem, key-value store, and/or other storage mechanism. Some member data, such as members' connections with each other within the professional social networking system, may be stored as a graph that includes nodes representing entities within the system (e.g., members, entities identified in member profiles); edges between the nodes, which represent relationships between the represented entities; and predicates that specify or label the edges.

A migration server 124 is a computer system configured to facilitate migration of data between domain 110 and domain 120. More specifically, a migration server receives a collection of data records (e.g., from data records 112) that identify entities (e.g., contacts) known within domain 110, and matches some or all of them to members (or users) within domain 120. Some data records may be used to train a machine-learning model (or multiple models), which is then used to migrate other records.

When different data schemas are employed in the two domains, which may normally be the case, and because not all entities known within domain 110 may be members of the professional social networking system of domain 120, some of the data records from domain 110 may not correspond to members represented by member data 122. In addition, different domains (e.g., other than domain 110) from which data are to be migrated to domain 120 may have different data schemas than domain 110; therefore, the migration process is sufficiently flexible and adaptive to support migration of data having multiple schemas that differ from the format of member data 122.

In particular, the migration server will use the data included in each data record 112 that it receives to identify, when possible, the member or members that best match the data record. In some cases, such as when the data record includes information that is accurate, precise, and distinguishing (e.g., a telephone number, a personal electronic mail address), one specific member within domain 120 may be identified with high confidence. Otherwise, if no such information is included in the data record, or if no member data includes the same information, one or more members that best match other fields of the record may be identified. These members may be ranked based on, for example, how well their associated data (e.g., their profiles in domain 120) correspond to the data record.

To assist in the matching process, a migration server or other component of domain 120 may execute a machine-learning model. Such a model may be trained with data records that were previously successfully matched to members within domain 120 (and/or records that could not be matched with members). For example, a model employed to match an entity from domain 110 with a member in domain 120 may be a regression model, artificial neural network, support vector machine, decision tree, naïve Bayes classifier, Bayesian network, clustering technique, collaborative filtering technique, hierarchical model, and/or ensemble model. The training or execution of a model may be performed on an offline, online, and/or on-demand basis to accommodate requirements or limitations associated with the processing, performance, or scalability of the computing components of domain 120.

In some embodiments, a migration server 124 includes and executes logic for (a) searching member data 122 and/or other data residing in domain 120 for members that correspond to data records 112 and (b) for each of multiple data records, ranking the members identified by the search logic based on how well they (e.g., their member profiles) match the contents of the data record. In some embodiments, the ranking logic includes a model trained to compare data records from domain 110 with entity data (e.g., member profiles) within domain 120.

Member data 122 may include information corresponding to millions, tens of millions, or hundreds of millions of individuals and organizations that are members or users of services provided by domain 120, such as the professional social network. In some implementation, the machine-learning model(s) of domain 120 execute (and the ranking is performed) only when an exact match cannot be found among member data 122 for a given data record 112. For example, an 'exact' query may first be executed to attempt to find an exact match among member data 122. One or more non-exact (or 'fuzzy') queries may be executed to possibly identify multiple matches that are less precise (e.g., if the exact query is unsuccessful).

For example, if a given data record 112 includes fields such as name, email, and phone, a migration server 124 or associated component (e.g., a database server) may configure and execute queries based on some or all permutations of field values, such as:

name
email
phone
name+email
name+phone
email+phone
name+email+phone

Queries such as those that include name+email or name+email+phone may be considered exact queries if they can be expected to be likely to return only single results among member data 122. Other queries listed above may be considered fuzzy or non-exact.

Results of one or more queries (if the results correspond to more than one member) may then be delivered to the model, along with the data record, which may include additional fields not used in the search or searches, in order to identify the best match or matches.

Data records of domain 110 may include different fields for different types of entities (e.g., individual, organization); therefore, exact and/or fuzzy queries of member data 122 may be configured differently (i.e., with different fields) for different types of entities and for different originating domains (e.g., domains other than domain 110, which may have different data schemas). For example, a data record for an individual may include some or all of the fields above, plus employer, position, education, skills, awards, etc. A data record for an organization may include some or all of the fields above, plus website (e.g., a Uniform Resource Locator or URL), headquarters (e.g., a corporate address), locations, etc.

In some embodiments, migration of multiple data records 112 is performed in real-time. In other words, a user or operator may submit or identify a set of data records 112 to be migrated, and one or more migration servers may immediately begin matching those records to members within domain 120. In these embodiments, results are provided to the operator soon after the set of data records is submitted. The results may include, for each data record, an identification or indication of a single member (e.g., an exact match, the 'best' match), or a list of two or more best matches with some measure of the confidence in each (e.g., as a percentage between 1% and 99%). In other embodiments, the migration may be performed offline.

Although migration server 124 is depicted as part of domain 120 in FIG. 1, in other embodiments a migration technique described herein may be performed by one or more computer systems that operate within domain 110 and/or external to both domains 110, 120.

Figure 2:
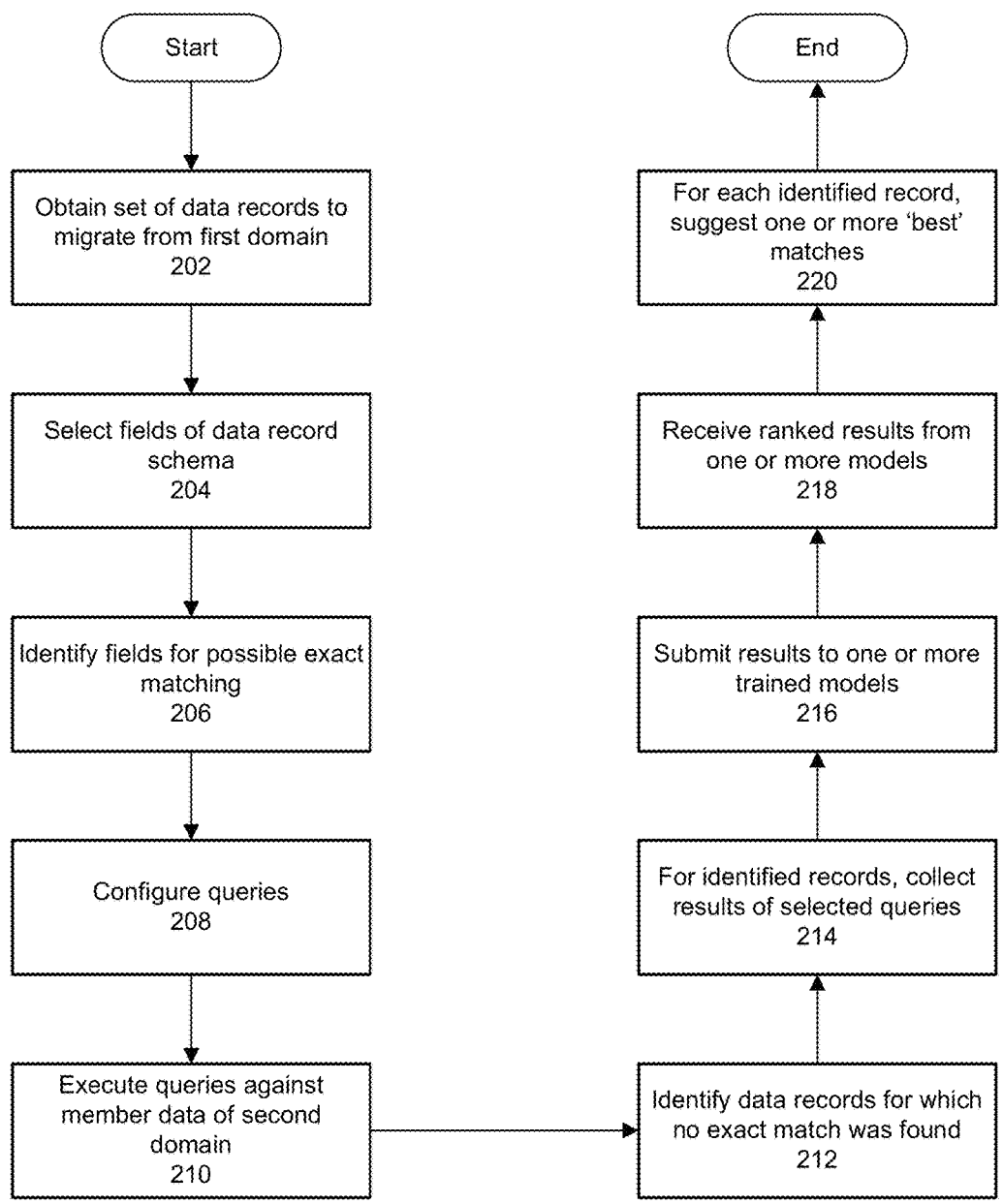
FIG. 2 is a flow chart illustrating a method of migrating data records between two data processing domains or systems, in accordance with some embodiments.

FIG. 2 is a flow chart illustrating a method of migrating data between two different domains or systems, according to some embodiments.

In these embodiments, data records represent contacts known within a first domain (e.g., a first data processing system or domain), and are to be used to identify corresponding entities (e.g., individuals, companies) that are members (or users) of a second domain (e.g., a second data processing system or domain). The members of the second domain are represented by profiles or other logical structures that may include all, some, or none of the information contained in the data records.

In operation 202, a set of data records is obtained from the first domain. In the illustrated embodiment, the data records adhere to a common schema; different domains from which data are to be migrated may feature data records having different schemas. The set of records may include all data records within the domain, all data records used by a particular user or operator within the domain, or some other subset of the domain's data records.

For example, one set of data records may be used for training one or more models used (as described below) for ranking entities of the second domain in terms of how well they match a given entity within the first domain and/or to configure or select queries for identifying subsets of entities within the second domain (e.g., to submit to the model(s)), while a second set of data records may then be migrated with the assistance of the models and/or the queries.

In operation 204, some or all fields of the schema are selected for use during the migration process (e.g., to formulate queries to be executed on data within the second domain). The fields that are selected may include those that have relatively high specificity, meaning that they are unlikely to match more than one or a few entities (e.g., name of an individual, electronic mail address, telephone number, organization website), and/or lower specificity, meaning that they may match multiple entities (e.g., employer name, location, industry, job title). Fields that are likely to be common or very common may not be selected (e.g., country, language) except for data records having values for those fields that are not common.

In operation 206, of the fields selected in operation 204, some of them may be selected for use in assembling 'exact' queries, which are queries that are expected or likely to return only a single match (or a low number of matches). For example, when the entities that are being matched between the two domains are individuals, fields such as email and phone may be unlikely to match more than one person, especially if both fields are used together. Similarly, when the entities are organizations, fields such as website and phone are unlikely to match more than one organization, especially if both fields are used together. If an identifier of a given entity within the second domain is known (e.g., a username, a member number) and is included in the data records, it would also be a good field to select for use in an exact query.

In some implementations, an exact query for an individual may include, in addition to or in place of email and phone fields, firstName+lastName, first Initial+lastName, firstName+geographical area, firstName+employer, lastName+employer, and/or other fields or combinations of fields.

In operation 208, multiple queries are configured, to be executed for some or all data records, based on the schema of the first domain's data records and/or the content of specific records. As already indicated, at least one query will be an exact query that is expected to identify a single member of the second domain. In addition, one or more additional fuzzy or non-exact queries are configured to include one or more other fields of the data records, and are likely to return match multiple members of the second domain. As described above, these queries may include any number of fields of the records (particularly those selected in operation 204), and any number of permutations of the selected fields.

Illustratively, however, queries that are likely (or known) to match a large number or percentage of members of the second domain may be eschewed. For example, a query for individuals based on their work position or job title may be omitted unless, perhaps, one or more data records have rather unique values for the position field, in which case such a query may help disambiguate among members of the second domain that would otherwise match those data records. As another example, if a large portion of the members of the second domain reside in a particular region or country, a query using only the geographical area field may be omitted, unless its contents are more specific than simply a region or country.

In operation 210, one or more of the queries are executed against member data of the second domain, for each data record obtained from the first domain.

In some embodiments, for a given data record, first an exact query is executed against the member data of the second domain (or multiple exact queries are executed). If the exact query does not match any member data, one or more additional queries (i.e., fuzzy queries) may be executed that are different than the exact query. For example, the exact query may normally be very specific (e.g., likely to match only a single member profile), a first additional query may be somewhat less specific than the exact query, a second additional query may be less specific than the first additional query, and so on. The fuzzy queries may be executed in turn (e.g., until one returns one or more results), such as from most specific to least specific in scope, or they may all be executed in parallel.

In operation 212, records for which single exact matches were found among the member data—i.e., for the exact queries configured in operation 208—may be considered resolved. That is, those exact matches are identified as the members of the second domain that correspond to the associated data records that generated the matches. Illustratively, the output of an exact match may be a corresponding member name or some other indicia (e.g., member ID, username, member profile). Data records for which no exact matches were found, but for which the additional queries returned results, are identified for further processing.

In operation 214, for each identified record, results returned by some or all of the fuzzy queries are aggregated and de-duplicated.

For example, in some implementations, first the query execution results of operation 210 are examined to identify those fuzzy queries that returned the exact matches, even if the exact match was just one of multiple results returned by the query. In other words, those non-exact queries that returned (among their other results) the same non-null results as the exact queries are selected. These non-exact queries are determined to be more useful than the other non-exact queries because those other queries did not even return the exact match.

Thus, for each identified record, the results of the selected fuzzy queries are aggregated and de-duplicated. Some results may be ignored, however, if too plentiful. For example, if a single query's results include more than a threshold number of matches (e.g., 100, 1,000) or more than a threshold percentage of the members of the second domain (e.g., 0.01%, 0.1%, 1%), that query's results may be ignored (unless, for example, it is the only selected query).

In some embodiments, this process of identifying the more useful fuzzy queries—i.e., those queries whose results are supersets of the exact query—may be performed before the migration process of FIG. 2 is conducted. In these embodiments, therefore, only the exact query and (if necessary) the more useful fuzzy queries are executed for the data records.

In operation 216, for each identified record, its aggregated and de-duplicated results are submitted to one or more models. Illustratively, a particular model may be specifically trained for the first domain, based on the schema of its data records, for example. This training may involve the use of data records that were previously resolved.

A model employed to evaluate matches between an entity in the first domain (represented by an identified data record) and entities in the second domain (identified by one or more queries) may compute similarities between the first domain entity and the second domain entities by comparing data extracted or derived from the identified data record and the second domain entity's associated information (e.g., within a member profile), generating a score for each datum, and then aggregating (e.g., summing) the scores. Some fields or data extracted from the record (e.g., name, email, phone) may be of greater significance (e.g., and be weighted more heavily) than other fields or data (e.g., education, year of birth, area code portion of the phone field, domain portion of the email field).

While a match between a particular datum obtained from the identified data record and an attribute of a second domain entity may boost the score of the second domain entity, a mismatch may not affect the entity's score or may decrease it. Also, the weight or score for matching a particular datum obtained from the data record may depend upon the variability of the datum, or such weights/scores may be normalized. For example, a member of the second domain whose email domain matches that of the identified data record may be less significant if that domain is used widely (e.g., comcast.com or some other internet service provider) than if the domain is small (e.g., a domain corresponding to a local single-location business).

In some embodiments, the model may employ natural language features such as a number (or percentage) of words (or characters) that match between a data record and a member profile, word (or character) distances, and the density of word matches between the data record and the profile. Contents of the data record and/or the member profile may be normalized, stop words may be eliminated, and other processing may be applied before or while the model operates.

In operation 218, for each identified record, output of the one or more models is in the form of a ranked list of members or member indicia (e.g., member name, username, member ID, member profile). For each member identified by the model, the corresponding confidence value, score, or rank is also output. An exact match may have a value of 1, for example, with other matches having lower values. When a large number of members is identified (e.g., greater than a threshold), their scores may be artificially lowered to reflect the uncertainty of the matching (e.g., to values below 0.8).

In operation 220, for each identified record, the single best match among the members, or the top N matches (e.g., if they are within some distance in terms of their confidence values) are returned as the best match(es) for the record. In some implementations, no match may be returned if none are assigned a sufficiently high confidence value.

Thus, based on the first domain's data records and the queries of the member data of the second domain, exact matches (having high confidence values) and/or best matches (that are not exact matches) are output. This output may be transmitted and/or displayed to the user or operator that initiated the migration (e.g., in real-time).

Figure 3:
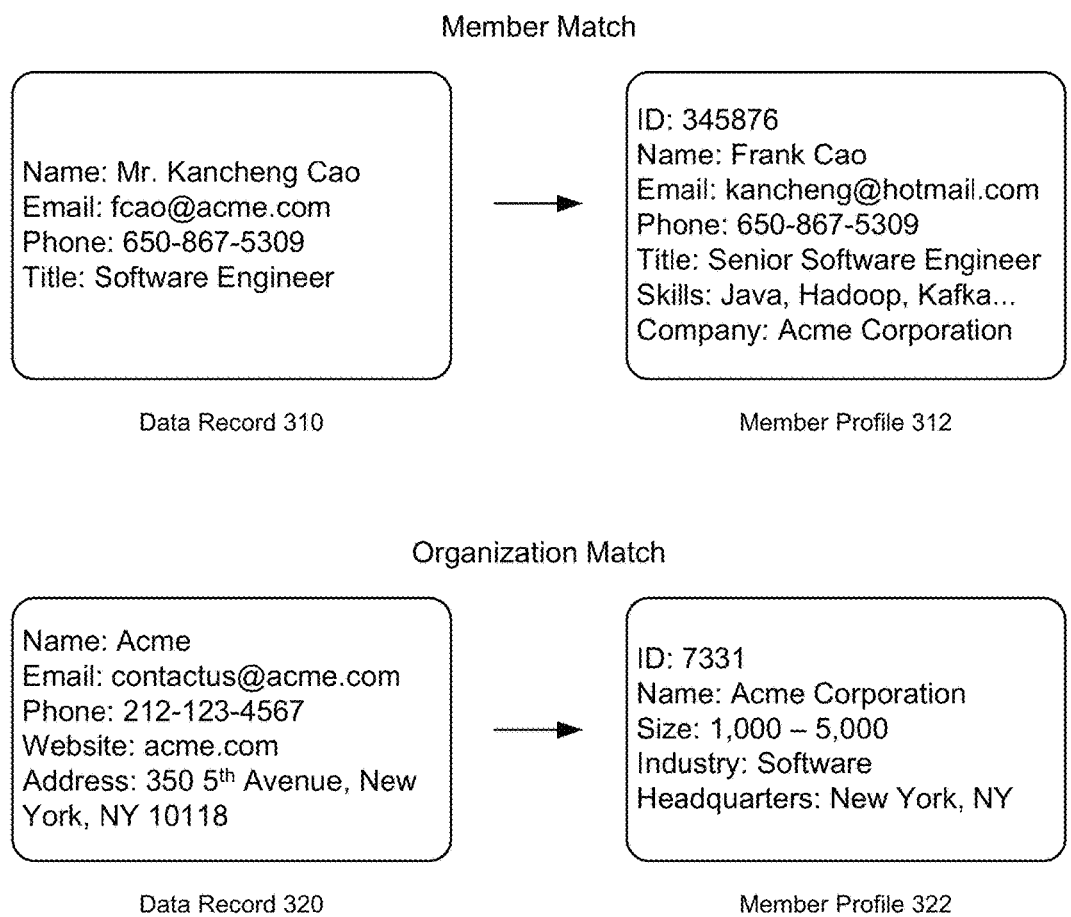
FIG. 3 depicts migration of an individual data record and an organization data record between two domains, according to some embodiments.

FIG. 3 depicts migration of an individual data record and an organization data record between two domains, according to some embodiments. In these embodiments, the first domain may be or may comprise an electronic address book, an electronic list of contacts, a directory of individuals/organizations, a human resources system, a database, or some other repository of electronic data that identifies individuals and/or organizations. The second domain may be or may comprise a system or service that includes a community of members (or users), such as a (professional) social network.

Data records 310, 320 represent, respectively, an individual and an organization known within the first domain. Member profiles 312, 322 represent entities known within the second domain that correspond to the individual and the organization, respectively.

Using a technique described herein, each data record is processed (e.g., by a migration server) to attempt to match the record to an exact match or to one or more 'best' matches within the second domain. Illustratively, member profile 312 may be an exact match (e.g., based on a mobile or work telephone number), while member profile 322 may be a 'best' match. Migration of either or both data records may involve querying member data of the second domain with one or more queries to identify relevant members, wherein the queries are populated with any combinations of data from the data records.

Thus, an exact query formulated with, for example, the name and phone fields of data record 310 may directly yield member profile 312 because of the matching telephone number and the matching last name. If the member data of the second domain did not yield a match for the exact query, other queries might have resulted in identifying one or more members that work for the company (Acme) identified in the email field of data record 310, that have the same or a similar title, etc.

However, in an environment in which exact queries for individuals require matching both the email and phone fields, for example, member record 312 would not be an exact match (and it may be assumed that the member data of the second domain includes no exact match). In this event, a non-exact (or fuzzy) query may be configured with fields such as employer, geographical area, gender, and firstInitial. The employer field, because it is not explicitly included in data record 310, may be derived from the domain of the email field (especially if the data records of the first domain include a record (such as record 320) corresponding to that employer). The geographical area field may be derived from the area code portion of the phone field, the gender field may be derived from the salutation portion of the name field, and the firstInitial field may be derived from the email field (e.g., because the rest of the email address prior to the '@' symbol matches the contact's last name).

After this query is configured (and possibly additional queries are configured), it and other queries, if appropriate, are executed against the member data of the second domain. Although it may generate multiple results (e.g., multiple male members with the same last name), as shown in FIG. 3, member profile 312 is the best match, or at least one of the best matches. More specifically, a machine-learning model is invoked with the results of the queries and, among the candidate profiles, member profile 312 is identified as the best match (e.g., with the highest ranking or confidence score).

Thus, as described above, the migration of data record 310 may include obtaining the data record, configuring one or more queries with information derived (directly and/or indirectly) from the record, executing an exact query to attempt to make an exact match among the member data of the destination domain, executing non-exact queries (e.g., if no exact match is found), ranking or scoring the results based on how well they match the query and/or the data record, and outputting one or more best matches (e.g., with suitable decoration). Although in some implementations fuzzy queries may be executed only if no exact query returns a hit, in other implementations they may be run even if an exact query is successful. As mentioned above, this may help identify better query formulations—that is, query formulations that (among other results) also identify the exact match.

Regarding data record 320, while an exact query formulated with, for example, the phone and website fields may fail to match any member profiles in the second domain, at least one non-exact query was executed and member profile 322 was returned as a (or the) best match, perhaps due to the member's name and headquarters location (and/or other data).

In some embodiments, data record fields that are used when matching a data record to an individual member of the second domain include one or more of: name (first and/or last), electronic mail address(es), telephone number(s), identifier for advertisers (IDFA), current employer, function/title/position, employer size, past employer(s), current address/location, past address(es)/location(s), school(s), degree(s), field of study, year of graduation, skills, seniority, industry, gender, and age (or date of birth). In other embodiments, other data may be employed.

In some embodiments, data record fields that are used when matching a data record to an organization member of the second domain include one or more of: address(es), electronic mail domain, electronic mail address(es), telephone number(s), description of organization/purpose, industry, number of employees, stock ticker symbol, website address, Twitter® ID, and logo. In other embodiments, other data may be employed.

As already indicated, some information may be derived from data within a data record to be migrated—such as a first initial, last name, and/or an employer from an electronic mail address, a gender from a title or salutation, and a geographical area from an area code of a telephone number. Some other derivations that may be possible include deriving a year of graduation from a birth year, an education (e.g., M.D., Ph.D.) from a salutation, and an educational institution from an electronic mail address (e.g., especially for students).

In some implementations, data records to be migrated from other domains to the second domain may be translated or transformed to match a single specified data schema corresponding to the member data within the second domain. Therefore, data records from different first domains that have different schemas could be first translated into a common schema that that facilitates accurate data migration.

A migration may be initiated by a member of the second domain (e.g., a member having many electronic contact records within a first domain), by a user or operator of a first domain who wishes to leverage the second domain's robust collection of data regarding its members, or by a third party. In addition to migrating data records from a first domain to the second domain, some of the migrated data records may be updated (if they will continue to be used). For example, during the migration, when a data record such as data record 310 is mapped to an exact match within the second domain, such as member profile 312, some information from that exact match may be used to update the data record.

Depending on the initiator of a data migration evolution, different standards may apply. If, for example, high confidence in identified matches is desired, the queries used for that migration (i.e., exact and/or non-exact) may be more specific—meaning that more fields of a migrating record may be used in the queries than when lower confidence is acceptable. Thus, a recruiter, for example, may desire high confidence in the matches identified during migration of his or her contact records, whereas a marketing specialist may accept lower confidence matches.

Figure 4:
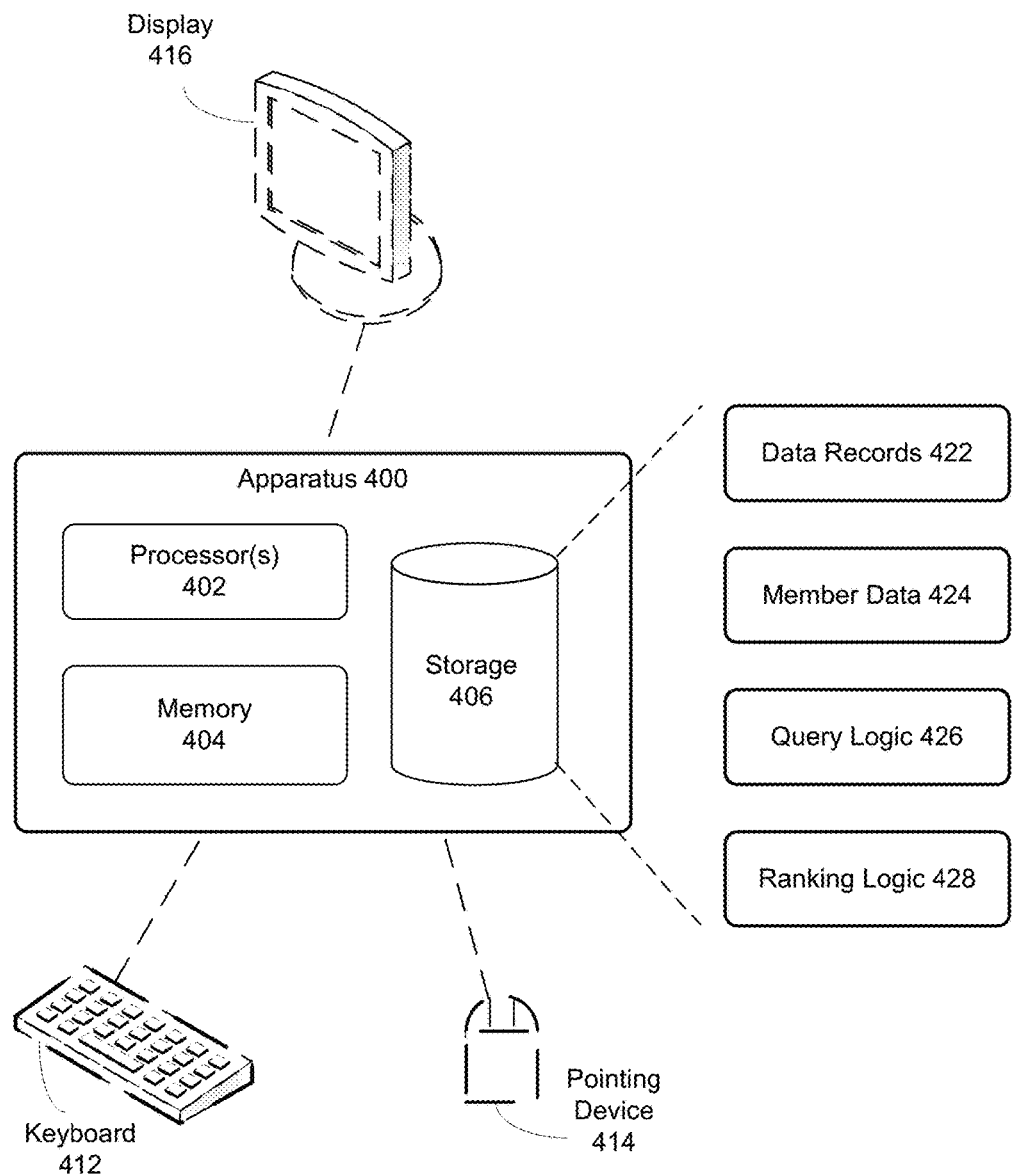
FIG. 4 depicts an apparatus for migrating data records between two data processing domains or systems, in accordance with some embodiments.

FIG. 4 depicts an apparatus for migrating data records between two different domains or systems, according to some embodiments.

Apparatus 400 of FIG. 4 includes processor(s) 402, memory 404, and storage 406, which may comprise any number of solid-state, magnetic, optical, and/or other types of storage components or devices. Storage 406 may include storage elements local to and/or remote from apparatus 400. Apparatus 400 can be coupled (permanently or temporarily) to keyboard 412, pointing device 414, and display 416.

Storage 406 stores data used during migration of entities from one domain to another. In the illustrated embodiments, the data includes one or more data records 422, each of which represents an entity known within a first domain, and one or more collections of member data 424 (e.g., member profiles), each of which represents an entity known within a second domain. Some fields or information may be common to data records 422 and member data 424, but often a data record will include one or more fields not found in a member data collection, and/or vice versa.

Storage 406 also stores logic and/or logic modules that may be loaded into memory 404 for execution by processor(s) 402, including query logic 426 and ranking logic 428. In other embodiments, these logic modules may be aggregated or further divided to combine or separate functionality as desired or as appropriate.

Query logic 426 comprises processor-executable instructions for configuring and executing queries against member data 424 (and/or data records 422). For example, the query logic may ingest a record from data records 422, parse it as necessary to extract one or more fields, derive related information if possible and desired (e.g., to identify a geographical area from an area code portion of a telephone number), configure one or more queries (e.g., an exact query, one or more fuzzy queries)—based on predetermined formats, possibly—and execute some or all of the queries. In some implementations, the ingestion, data parsing/extraction, derivation, and/or other actions may be performed by separate logic modules.

Ranking logic 428 comprises processor-executable instructions for ranking, when necessary, multiple non-exact results yielded by the queries executed by query logic 426. For example, the ranking logic may include one or more machine-learning models (e.g., separate models for different first domains or for data records having different contents) that receive the results of the query or queries executed for a given data record, generate scores indicating how well the data record matches different collections of member data, and output one or more 'best' results that identify the members that best match the entity represented by the data record; the results may be provided with their calculated confidence scores.

Other logic may reside in storage 406 for execution by processor(s) 402, if not included in query logic 426 and/or ranking logic 428. For example, a migration logic module may handle tasks such as obtaining the data records, invoking the query logic as needed (e.g., to invoke all or a subset of possible queries or query formats), invoke the ranking logic when multiple collections of member data 424 are identified by the queries, output the exact or best matches of data records (e.g., with confidence scores), etc.

By configuring privacy controls or settings as they desire, members of a social network, a professional network, or other user community that may use, interact, or otherwise be involved with embodiments described herein can control or restrict the information that is collected from them, the information that is provided to them, their interactions with such information and with other members, and/or how such information is used. Implementation of these embodiments is not intended to supersede or interfere with the members' privacy settings.

An environment in which one or more embodiments described above are executed may incorporate a general-purpose computer or a special-purpose device such as a hand-held computer or communication device. Some details of such devices (e.g., processor, memory, data storage, display) may be omitted from the discussion herein for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A computer-implemented method for migrating an entity from a first data processing domain to a second data processing domain, the method comprising:
    obtaining a first set of data records and a second set of data records having a common schema, each data record representing one entity within the first domain, wherein the first set of data records and the second set of data records have no intersection;
    accessing multiple collections of member data within the second domain, each collection of member data representing one entity within the second domain;
    associating with the first domain an exact query that includes one or more terms of the common schema and is likely to match, for each data record, no more than one collection of member data in the second domain;
    configuring multiple queries with different terms of the common schema, wherein each of the multiple queries differs from the exact query;
    for each data record in the second set of data records:
        executing the exact query and the multiple queries against the multiple collections of member data; and
        when the exact query matches a given collection of member data, identifying among the multiple queries one or more candidate non-exact queries whose results include the given collection of member data; and
    for each data record in the first set of data records:
        executing the exact query against the multiple collections of member data;

when the exact query fails to match any of the multiple collections of member data, executing against the multiple collections of member data at least one additional query different from the exact query; and when results of one or more of the exact query and the at least one additional query identify multiple collections of member data, ranking the multiple collections of member data according to their similarity to the data record.

2. The method of claim 1, wherein the at least one additional query includes only candidate non-exact queries.

3. The method of claim 1, wherein:
the second data processing domain comprises a professional social networking system; and
the collections of member data comprise profiles of members of the professional social networking system.

4. The method of claim 1, wherein said executing against the multiple collections of member data at least one additional query different from the exact query comprises:
executing a first additional query that is less specific than the exact query; and
when the first additional query fails to match any of the multiple collections of member data, executing a second additional query that is less specific than the first additional query.

5. The method of claim 1, wherein the migration is performed in real-time.

6. The method of claim 1, wherein ranking the multiple collections of member data according to their similarity to the data record comprises:
inputting the multiple collections of member data and the data record to a model; and
receiving from the model a ranked ordering of the multiple collections of member data.

7. An apparatus for migrating an entity from a first data processing domain to a second data processing domain, comprising:
one or more processors; and
memory storing instructions that, when executed by the one or more processors, cause the apparatus to:
obtain a first set of data records and a second set of data records having a common schema, each data record representing one entity within the first domain, wherein the first set of data records and the second set of data records have no intersection;
access multiple collections of member data within the second domain, each collection of member data representing one entity within the second domain;
associate with the first domain an exact query that includes one or more terms of the common schema and is likely to match, for each data record, no more than one collection of member data in the second domain;
configure multiple queries with different terms of the common schema, wherein each of the multiple queries differs from the exact query;
for each data record in the second set of data records:
execute the exact query and the multiple queries against the multiple collections of member data; and
when the exact query matches a given collection of member data, identify among the multiple queries one or more candidate non-exact queries whose results include the given collection of member data; and for each data record in the first set of data records:
execute the exact query against the multiple collections of member data;
when the exact query fails to match any of the multiple collections of member data, execute against the multiple collections of member data at least one additional query different from the exact query; and
when results of one or more of the exact query and the at least one additional query identify multiple collections of member data, rank the multiple collections of member data according to their similarity to the data record.

8. The apparatus of claim 7, wherein the at least one additional query includes only candidate non-exact queries.

9. The apparatus of claim 7, wherein:
the second data processing domain comprises a professional social networking system; and
the collections of member data comprise profiles of members of the professional social networking system.

10. The apparatus of claim 7, wherein said executing against the multiple collections of member data at least one additional query different from the exact query comprises:
executing a first additional query that is less specific than the exact query; and
when the first additional query fails to match any of the multiple collections of member data, executing a second additional query that is less specific than the first additional query.

11. The apparatus of claim 7, wherein the migration is performed in real-time.

12. The apparatus of claim 7, wherein ranking the multiple collections of member data according to their similarity to the data record comprises:
inputting the multiple collections of member data and the data record to a model; and
receiving from the model a ranked ordering of the multiple collections of member data.

13. A system for migrating an entity from a first data processing domain to a second data processing domain, comprising:
one or more processors;
a data migration module comprising a non-transitory computer readable medium storing instructions that, when executed, cause the system to:
obtain a first set of data records and a second set of data records having a common schema, each data record representing one entity within the first domain, wherein the first set of data records and the second set of data records have no intersection; and
access multiple collections of member data within the second domain, each collection of member data representing one entity within the second domain;
a query module comprising a non-transitory computer readable medium storing instructions that, when executed, cause the system to:
associate with the first domain an exact query that includes one or more terms of the common schema and is likely to match, for each data record, no more than one collection of member data in the second domain;
configure multiple queries with different terms of the common schema, wherein each of the multiple queries differs from the exact query;
for each data record in the second set of data records:
execute the exact query and the multiple queries against the multiple collections of member data; and when the exact query matches a given collection of member data, identify among the multiple queries one or more candidate non-exact queries whose results include the given collection of member data; and for each data record in the first set of data records:
execute the exact query against the multiple collections of member data; and
when the exact query fails to match any of the multiple collections of member data, execute against the multiple collections of member data at least one additional query different from the exact query; and a ranking module comprising a non-transitory computer readable medium storing instructions that, when executed, cause the system to, for each data record in the set of data records:
when results of one or more of the exact query and the at least one additional query identify multiple collections of member data, rank the multiple collections of member data according to their similarity to the data record.

14. The system of claim 13, wherein the at least one additional query includes only candidate non-exact queries.

15. The system of claim 13, wherein:
the second data processing domain comprises a professional social networking system; and
the collections of member data comprise profiles of members of the professional social networking system.

16. The system of claim 13, wherein said executing against the multiple collections of member data at least one additional query different from the exact query comprises:
executing a first additional query that is less specific than the exact query; and
when the first additional query fails to match any of the multiple collections of member data, executing a second additional query that is less specific than the first additional query.

17. The system of claim 13, wherein ranking the multiple collections of member data according to their similarity to the data record comprises:
inputting the multiple collections of member data and the data record to a model; and
receiving from the model a ranked ordering of the multiple collections of member data.

* * * * *